UNITED STATES PATENT OFFICE.

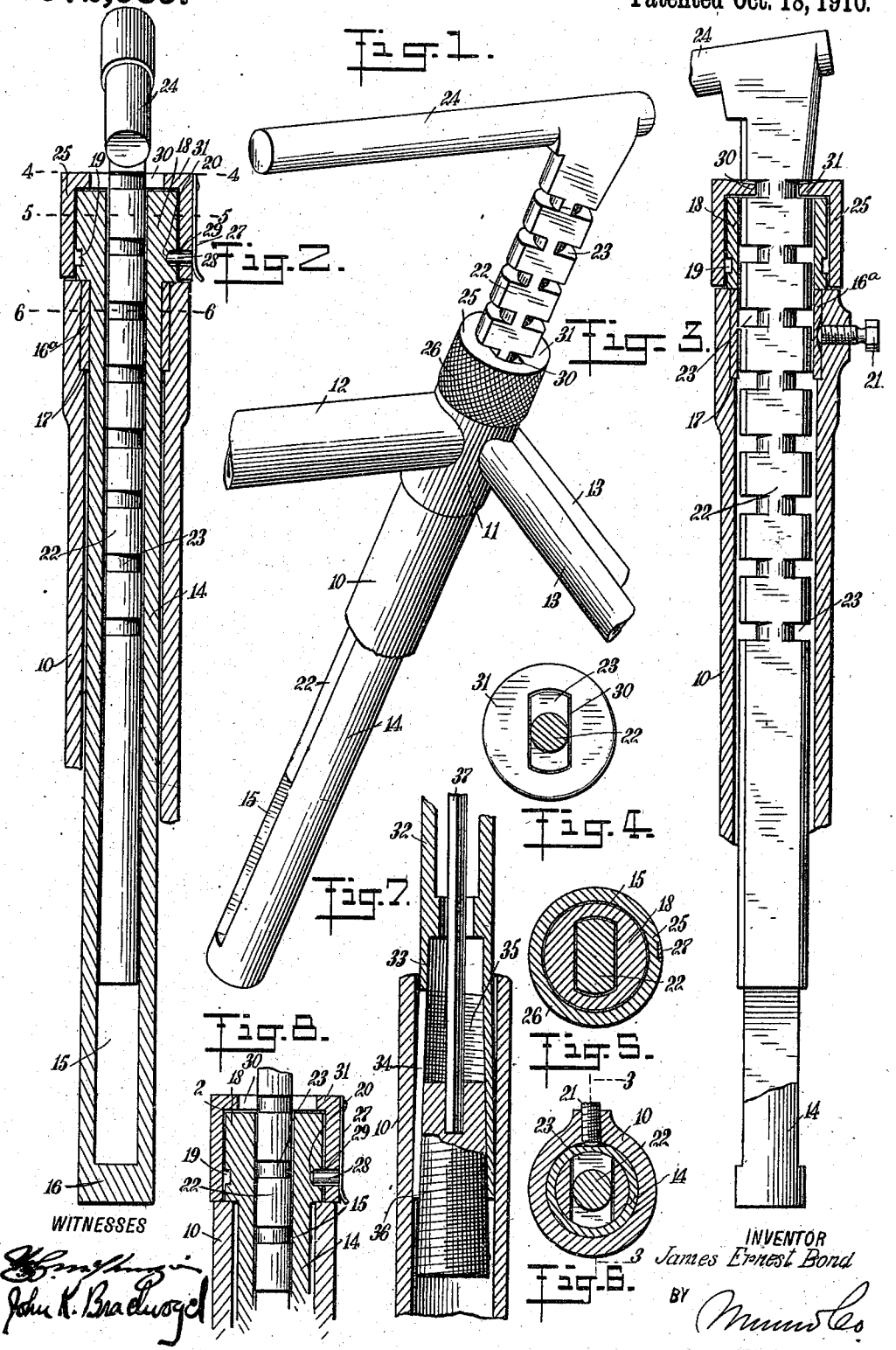

JAMES ERNEST BOND, OF GLOBE, ARIZONA TERRITORY.

ADJUSTABLE POST-SUPPORT.

972,989. Specification of Letters Patent. Patented Oct. 18, 1910.

Application filed January 5, 1910. Serial No. 536,505.

*To all whom it may concern:*

Be it known that I, JAMES ERNEST BOND, a citizen of the United States, and a resident of Globe, in the county of Gila and Territory of Arizona, have invented a new and Improved Adjustable Post-Support, of which the following is a full, clear, and exact description.

This invention relates to adjustable post supports for bicycles, motorcycles and the like, serving to carry seats, handle-bars or other parts, and relates more particularly to a device of this class comprising a socket, a post slidable within the socket, and an adjustable member associated with the socket and serving in predetermined positions to hold the post in a plurality of adjustments.

The object of the invention is to provide a simple, strong and durable post support for bicycles, motorcycles and the like for carrying the seats, handle-bars or other part which it is desired to mount adjustably in place, by means of which the part carried thereby can be easily raised or lowered without the employment of a wrench or other tool, which securely holds the post in position against accidental displacement, and which can be manipulated easily and rapidly.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a perspective view of a part of a bicycle frame showing an embodiment of my invention applied thereto; Fig. 2 is a longitudinal section of a part of a bicycle frame showing a post support mounted therein; Fig. 3 is a longitudinal section on the line 3—3 of Fig. 6; Fig. 4 is a transverse section on the line 4—4 of Fig. 2; Fig. 5 is a similar view on the line 5—5 of Fig. 2; Fig. 6 is a similar view on the line 6—6 of Fig. 2; Fig. 7 is a longitudinal section of part of a bicycle frame and part of a modified form of my invention; and Fig. 8 is a longitudinal section of a part of a bicycle frame showing the upper part of an embodiment of my invention applied thereto.

Before proceeding to a more detailed explanation of my invention, it should be clearly understood that while I have shown for example, in the accompanying drawings, the device as used in the form of an adjustable seat-post for carrying the seat of a bicycle, it can also be advantageously employed for other like purposes, for instance, for mounting the handle-bars of a bicycle in position.

Certain of the details of construction, as will be hereinafter set forth, form no part of my invention and can be varied in accordance with individual preference and special conditions, without departing from the underlying spirit of the invention.

Referring more particularly to the drawings, I have shown for example, a tubular member 10 of a bicycle frame, in which the seat post is normally mounted, the member 10 having at the upper part a joint 11 by means of which it is associated with the top-bar 12 and the rear forks 13 of the bicycle frame. I employ a socket 14 positioned within the tubular member 10 and having a slot 15 extending longitudinally thereof to within a short distance of the bottom 16 of the socket. With certain types of bicycles the seat post is positioned within a sleeve located in the upper end of the member 10, and, if so desired, or if necessary, my socket member 14 may be located within a sleeve 16$^a$ seating upon an annular shoulder 17 formed within the upper end of the member 10. The socket has a head 18 at the upper end, provided with an annular groove 19, which has a deeper recess 20, for a purpose which will appear hereinafter. The head 18 is laterally extended and seats at the upper rim of the frame member 10, extending laterally beyond the sleeve 16$^a$ as is shown most clearly in Figs. 2 and 3. As shown in Fig. 8, the sleeve 16$^a$ may be dispensed with. A set-screw 21 as is customary, may be employed to lock the sleeve in place when the same is used.

The slot 15 is of angular cross-section and has slidable therewithin a post 22 of similar form and provided at opposite sides with a plurality of corresponding notches 23. The post 22 may have any suitable means for supporting a saddle, or a pair of handle-bars or the like. As is shown for example herewith, it may have a laterally extending arm 24 upon which the seat can be mounted.

I employ a collar 25 substantially annular in form and having the outer surface 26, burred or otherwise roughened, so that it can be easily manipulated. It has a spring arm 27 provided with a stud 28 extending through an opening 29 into the annular groove 19, so that when the stud engages the recess 20 the collar is locked against rotary movement. Needless to say, the engagement of the stud with the annular groove, while permitting the collar to be rotated freely, prevents the same from being accidentally or otherwise withdrawn from the head 18 which it encompasses. The extremity of the spring arm 27 is outwardly disposed and bent so that it can be operated to withdraw the stud from the recess 20 when it is desired to rotate the collar.

The collar has in the top 31 an opening 30 corresponding in cross section to that of the post 22, so that in a predetermined position of the collar the post can be moved freely, longitudinally of the socket. The top 31 is beveled so that when the collar is rotated, to force it into the notches 23 of the post, it tends to jam in position. It will be understood that when the collar is positioned so that the opening 30 registers with the end of the slot 15 the post can be adjusted in the direction of its length, to raise or lower the saddle or other member which it carries. By rotating the collar so that the top thereof engages within one or the other of the pairs of notches 23, the post is securely locked in position.

Any suitable means can be employed for securing the socket within the tubular member 10. I have shown in Fig. 7, an example of the means which can be employed. In this form of the device the socket 32 has an extension 33 which has a slot 34 so that it can be expanded, and which is provided interiorly with threads 35. A tapered, correspondingly threaded plug 36 is positioned within the extension 33 and has associated therewith a stem 37 by means of which it can be rotatably manipulated. By turning the plug in one direction it tends to expand the extension 33 to jam the same within the tubular member 10. By turning the plug, through the agency of the stem 37, the socket can be released. I do not wish to limit myself to this feature, nor for example, to the means for locking the collar 25 in position, and these details can be varied if so desired. Likewise, the set-screw 21 commonly employed for securing the sleeve 16ª in position, can be dispensed with and any other equivalent device can be used.

Having thus described my invention, I claim as new, and desire to secure by Letters Patent:

1. A device of the class described, comprising a socket, a post slidable within said socket, a rotatable member associated with said socket and serving in a predetermined position to hold said post against movement longitudinally of said socket, and means for locking said member in position such that said post is held against movement longitudinally of said socket.

2. A device of the class described, comprising a socket, a post slidable within said socket, a rotatable member associated with said socket and serving in a predetermined position to hold said post against movement longitudinally of said socket, means for locking said member in position such that said post is held against movement longitudinally of said socket, and means for clamping said socket within a suitable hollow part of a bicycle frame, said member being adapted to hold said post in any one of a plurality of positions.

3. A device of the class described, comprising a socket, a post slidable therein, said socket and said post being formed to hold said post against rotation within said socket, and a collar rotatably associated with said socket and having an opening permitting said post to pass therethrough, said post having a part cut away, whereby said collar can be rotated when said post is in a predetermined position, to lock said post in place.

4. A device of the class described, comprising a socket having an opening of angular cross section, a post of angular cross section slidable within said opening, a collar rotatably associated with said socket and having an opening corresponding in cross section to that of said post, said post having a part of circular cross section, whereby, when said part registers with said opening of said collar the latter can be rotated to lock said post against movement longitudinally of said socket.

5. A device of the class described, comprising a socket having an opening of angular cross section, a post of angular cross section slidable within said opening, a collar rotatably associated with said socket and having an opening corresponding in cross section to that of said post, said post having a part of circular cross section, whereby, when said part registers with said opening of said collar the latter can be rotated to lock said post against movement longitudinally of said socket, said collar having means engaging said socket, whereby said collar can be releasably held against rotation.

6. A device of the class described, comprising a socket adapted to be positioned in a hollow part of a bicycle frame and having a slot extending longitudinally thereof, a post slidable within said slot, said socket having a laterally extended head, and a collar movably mounted upon said head and operable to lock said post in any one of a plurality of positions, said head having a groove, said collar having a superposed stud engaging said groove, said head further having a recess adapted to receive said stud, whereby said collar can be locked against movement.

7. A device of the class described, comprising a socket having a slot of angular cross section, a post of angular cross section slidable within said slot and having notches in the opposite sides, and a collar rotatably associated with said socket and having a top provided with an opening corresponding in cross section with that of said post, said top being beveled toward said opening, said notches being adapted to receive the sides of said top, whereby said collar can be rotatably manipulated to lock said post in any one of a plurality of positions.

8. A device of the class described, comprising a socket having a slot of angular cross section, a post of angular cross section slidable within said slot and having notches in the opposite sides, a collar rotatably associated with said socket and having a top provided with an opening corresponding in cross section with that of said post, said top being beveled toward said opening, said notches being adapted to receive the sides of said top, whereby said collar can be rotatably manipulated to lock said post in any one of a plurality of positions, means whereby said collar can be locked against rotation in position such that said post is held against movement longitudinally of said socket, and means for securing said socket within a hollow member of a bicycle frame.

In testimony whereof I have signed my name to this specification in the presence of two subscribing witnesses.

JAMES ERNEST BOND.

Witnesses:
ROY KIRKPATRICK,
MARGARET THOMAS.